3,392,147
PROCESS FOR THE FORMATION OF 2,6-DIARYL
POLYPHENYLENE ETHERS
Willem F. H. Borman, Pittsfield, Mass., assignor to General Electric Company, a corporation of New York
No Drawing. Filed Mar. 22, 1967, Ser. No. 625,028
8 Claims. (Cl. 260—47)

ABSTRACT OF THE DISCLOSURE

A process for the formation of an aryl substituted polyphenylene ether or for increasing the molecular weight of an aryl substituted polyphenylene ether comprising oxidative coupling in the presence of a small quantity of a phenolic additive having a greater oxidative coupling capability than that of the monovalent phenol from which the aryl substituted polyphenylene ether is formed.

INTRODUCTION

This invention relates to a process for forming aryl substituted polyphenylene ethers characterized by increased average molecular weight and broader molecular weight distribution. More particularly, this invention relates to a process for the formation of aryl substituted polyphenylene ethers comprising the oxidative coupling of monovalent phenols in the presence of an oxygen bearing copper–amine complex catalyst and a small quantity of a phenol having an oxidative coupling capability greater than that of the monovalent phenol to be polymerized. In addition, this invention relates to a process for increasing the average molecular weight and solution viscosity of an aryl substituted polyphenylene ether by an oxidative coupling reaction performed in the presence of an oxygen bearing copper-amine complex catalyst and a small quantity of a phenol having an oxidative coupling capability greater than that of the monovalent phenol from which the polyphenylene ether was formed.

BACKGROUND OF THE INVENTION

The formation of polyphenylene ethers is known and described and claimed in copending U.S. patent applications of Allan S. Hay, Ser. Nos. 212,127 (now Patent No. 3,306,874) and 212,128 (now Patent No. 3,306,875) filed concurrently July 24, 1962, and 593,733 filed Nov. 14, 1966, all incorporated herein by reference. The process involves the oxidative coupling of monovalent phenols using a copper-amine complex catalyst. Those phenols which may be polymerized by the process have the structural formula

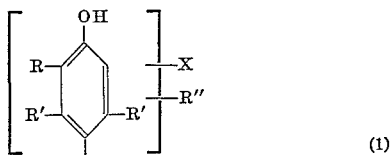

(1)

where X is a substituent selected from the group consisting of hydrogen, chlorine, bromine and iodine; R is a monovalent substituent selected from the group consisting of hydrogen, hydrocarbon radicals, halohydrocarbon radicals having at least 2 carbon atoms between the halogen atom and phenol nucleus, hydrocarbonoxy radicals, and halohydrocarbonoxy radicals having at least 2 carbon atoms between the halogen atom and phenol nucleus; and R' and R" are the same as R and in addition, halogen. Details for the formation of these polymers can be found in the above noted Hay patent applications.

The polymers formed by the process of Hay are high performance thermoplastics having a unique combination of properties including (1) a wide useful temperature range extending from a brittle point of approximately −275° F. to a heat distortion temperature of 375° F. (at 264 p.s.i.); (2) mechanical properties that are relatively constant over a wide temperature range; (3) excellent electrical properties over a wide range of temperatures and frequencies; (4) unusual resistance to aqueous environments including acids bases and steam; and (5) processability on conventional extrusion and injection molding equipment. The polymers may be used for all purposes heretofore known for thermoplastics including formation of fibers, films and shaped articles by conventional fabricating techniques such as extrusion, hot molding and vacuum forming.

The aryl substituted polyphenylene ethers formed by the process of Hay are high melting, high molecular weight materials with intrinsic viscosities of up to approximately 1.0 deciliter per gram (dl./g.) as measured in chloroform at 30° C. The high melting property of the polymers renders solution processing for the formation of films and fibers more desirable than melt processing. It is known that to obtain thick monofilaments or films by solvent processing, the solutions involved must have the highest possible solution viscosities. It has been found that relative to other polymers, the viscosity of a solution formed from an aryl substituted polyphenylene ether prepared by the process of Hay is low for any given polymer concentration. This is believed to be due, in part, to a narrow molecular weight range for the polymer as indicated by a weight to number average molecular weight ratio of approximately 2.0 to 3.0 and intrinsic viscosities limited to a maximum of 1.0 dl./g. as measured in chloroform at 30° C.

STATEMENT OF THE INVENTION

The present invention is predicated upon the discovery that oxidatively coupling an aryl substituted monovalent phenol using an oxygen bearing copper-amine complex catalyst in the presence of a small amount of a phenol having an oxidative coupling capability greater than that of the monovalent phenol to be polymerized (hereinafter referred to as phenolic additive) results in a polymer having the following characteristics as compared to an aryl substituted polyphenylene ether formed by the process described by Hay in the above-noted copending patent applications:

(1) higher average molecular weight,
(2) broader molecular weight distribution as evidenced by a weight to number average molecular weight ratio of from approximately 5–7, and
(3) higher intrinsic viscosities, generally exceeding 1.0 dl./g. per gram as measured in chloroform at 30° C.

The viscosities of solutions formed from polymers prepared in accordance with this invention are higher than those of solutions prepared from polymers formed by the Hay process at any given polymer concentration. Consequently, the polymer is especially well suited for the formation of films and fibers by solution processes.

Accordingly, an object of this invention is to provide a process for the formation of aryl substituted polyphenylene ethers having relatively higher molecular weights and intrinsic viscosities and broader molecular weight distributions than aryl substituted polyphenylene ethers formed by known processes.

Another object of this invention is to provide a process for the formation of aryl substituted polyphenylene ethers comprising the oxidative coupling of an aryl substituted monovalent phenol in the presence of an oxygen bearing copper-amine complex catalyst and a small quantity of a phenolic additive having an oxidative coupling capability greater than that of the monovalent phenol to be polymerized.

An additional object of this invention is to provide an aryl substituted polyphenylene ether suitable for the formation of films and fibers by solution processes.

Other objects and advantages of this invention will be in part apparent and in part pointed out in the description which follows.

DETAILED STATEMENT OF THE INVENTION

The aryl substituted polyphenylene ethers with which this invention is concerned are those formed from monovalent phenols having the structural formula

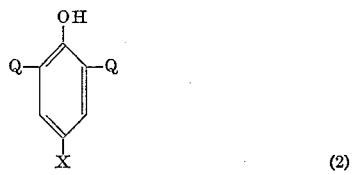

(2)

where X is a member selected from the group consisting of hydrogen, chlorine, bromine and iodine; and Q is aryl radical. It should be understood that each Q may represent a different substituent, but it is preferred that at least one of said Q's be phenyl.

In general, any phenol having a greater oxidative coupling capability than that of the aryl substituted phenol to be polymerized may be used as an additive in the oxidative coupling reaction to obtain a polyphenylene ether of enhanced properties as defined above. By higher oxidative coupling capability, it is meant that the phenol will enter into an oxidative coupling reaction in the presence of an oxygen bearing copper-amine catalyst, under any given conditions, more readily than the aryl substituted phenol to be polymerized. Those phenols having higher oxidative coupling capability generally are of lower molecular weight than the phenol to be polymerized, have less bulky substituents on the aryl nucleus, or are of higher functionality. A preferred class of phenols are those corresponding to the following formula

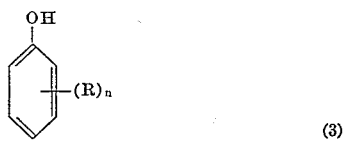

(3)

where R represents a member selected from the group consisting of alkyl, aryl, alkaryl, aralkyl and

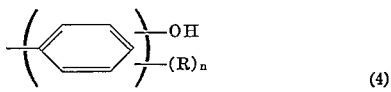

(4)

where R has the same meaning; and $n$ represents a number ranging from between 0 and the number of replaceable hydrogen atoms on the phenol nucleus; provided that the oxidative coupling capability of the phenol is greater than that of the aryl substituted phenols to be polymerized. It should be understood that R may represent the same or different substituents when $n$ is greater than 1.

Typical examples of phenols corresponding to Formula 3 above, include by way of example, phenol itself, o-cresol, m-cresol, p-cresol, 2,6-xylenol, 2,5-xylenol, 3,5-xylenol, 3,5-trimethylphenol, 2,5-diphenylphenol, 4,4'-dihydroxy biphenyl, 4,2'-dihydroxyl-3,4,3'-triphenyl biphenyl, etc.

The oxidative coupling of monovalent phenols using an oxygen bearing copper-amine complex catalyst is described in detail in the above-noted copending patent application of Allan S. Hay. In general, the process involves passing oxygen or an oxygen containing gas through a solution of the phenol to be polymerized, a cuprous salt or a cupric salt capable of being converted to a cuprous salt, and a primary, secondary or tertiary amine. The reaction is maintained at ambient or elevated temperature. The reaction is preferably performed under conditions providing rapid water or acid removal such as in the presence of drying or neutralizing agents or with solvent-temperature combinations that allows water to be carried off in the vapor. Examples of suitable copper salts, amines and reaction conditions are set forth in the referenced Hay applications.

The process of the present invention is similar to that set forth above, but with the addition of a small amount of a phenolic additive having a higher oxidative coupling capability than the phenol to be polymerized. The concentration of the phenolic additive is dependent upon the particular phenolic additive used and will vary according to the reactivity of this phenol, more reactive phenols being used in smaller quantities than less reactive phenols. In general, improved results are seen when the concentration of the phenolic additive is as low as 0.01% by weight, based upon the phenol to be polymerized. There is a definite upper limit to this concentration, excess resulting in decreased polymer viscosity. Again, dependent upon the phenol used, the concentration can range up to about 5.0% by weight based upon the weight of the phenol to be polymerized.

The process of the present invention is also applicable to the repolymerization of low to medium molecular weight aryl substituted polyphenylene ether. The process is the same with oxygen being passed through a solution of polymer, copper salt, amine and phenolic additive of greater oxidative coupling capability than that of the phenol from which the polymer is formed. The repolymerized polymer has a higher average molecular weight, a broader molecular weight distribution and higher intrinsic viscosity.

The following examples serve to illustrate the invention in more detail, but should not be construed as limiting the invention thereto, the parts being by weight unless otherwise indicated.

In the following examples, a 500 ml. round bottomed flask contained in an electric heating mantle, was equipped with a mechanically driven, sealed stirrer, thermometer, Dean-Starke trap, reflux condenser and oxygen inlet. The connection to the Dean-Stark trap was wrapped with electrical heating tape to prevent condensation of exit vapors before they reached the condenser, and the trap was filled with benzene before starting the reaction.

Example 1

This example serves to illustrate a prior art procedure for the preparation of an aryl substituted polyphenylene ether, the process being performed in the absence of a phenolic additive.

One hundred ml. of benzene was placed in the reactor and heated to 65° C. with passage of an oxygen stream through the benzene at a rate of 500 cc.'s per minute. In a separate flask, a solution was prepared consisting of 30 gms. of diphenylphenol, 0.045 gms. of cuprous bromide, and 0.045 gms. of N,N,N',N'-tetramethylethylenediamine dissolved in 50 ml. of benzene. This solution was heated to a temperature of from 50 to 65° C. and purged with nitrogen gas. It was then slowly added to the reactor over a total period of 25 minutes using an electrically heated addition funnel. Following addition of the solution to the reactor, the reaction was allowed to continue for three hours, followed by dilution of the reaction mixture with 150 ml. of benzene. Insoluble impurities were removed by centrifugation. The reaction mixture was then added slowly to 1000 mls. of methanol in a Waring Blendor to precipitate the polymer. The polymer was recovered by filtration, washed with methanol and dried overnight at 100° C. The product weighed 27.0 grams and had an intrinsic viscosity of 0.90 deciliter per gram (dl./g.) as measured in chloroform at 30° C.

Examples 2–13

The procedure of Example 1 was repeated with addition of small amounts of various phenols to the reaction mixture prior to the initiation of the polymerization reaction. The phenolic additive used, the concentration of the phenolic additive based upon the weight of the phenol to be polymerized and the intrinsic viscosity of the resulting polymer in deciliters per gram as measured in chloroform at 30° C. are set forth in the following table for each example.

| Ex. No. | Additive | Concentration, Percent | Intrinsic Viscosity, dl/g. |
|---|---|---|---|
| 2 | Phenol | 0.17 | 1.44 |
| 3 | do | 0.33 | 1.26 |
| 4 | o-Cresol | 0.33 | 1.16 |
| 5 | m-Cresol | 0.33 | 1.36 |
| 6 | p-Cresol | 0.33 | 1.20 |
| 7 | 2,6-xylenol | 0.33 | 1.48 |
| 8 | 2,5-xylenol | 0.33 | 1.31 |
| 9 | 3,5-xylenol | 0.33 | 1.03 |
| 10 | 3,4,5-trimethylphenol | 0.50 | 1.21 |
| 11 | 2,5-diphenylphenol | 1.60 | 1.24 |
| 12 | 4,4'-dihydroxybiphenyl | 0.33 | 1.13 |
| 13 | 4,2'-dihydroxy-3,5,3'-triphenyl biphenyl | 0.33 | 1.45 |

In all of the above examples, the polymerization reaction performed in the presence of a phenolic additive resulted in a polymer having an intrinsic viscosity in excess of 1.0 as compared to a polymer having an intrinsic viscosity of 0.90 using the same polymerization reaction without the phenolic additive.

Examples 14–18

The procedure of Example 1 was repeated with phenolic additives having oxidative coupling capabilities close to or less than 2,6-diphenylphenol with the following results obtained:

| Ex. No. | Additive | Concentration, Percent | Intrinsic Viscosity, dl/g. |
|---|---|---|---|
| 14 | o-Phenylphenol | 0.33 | 0.69 |
| 15 | p-Phenylphenol | 0.33 | 0.55 |
| 16 | 2,2'-dihydroxy biphenyl | 0.33 | 0.76 |
| 17 | 2,2'-dihydroxy biphenyl | 0.10 | 0.81 |
| 18 | 2,6-dichlorophenol | 0.33 | 0.05 |

Examples 19–28

Thirty gms. of 2,6-diphenylphenol, 0.090 gms. of cuprous bromide, 0.090 gms. of N,N,N',N'-tetramethyl ethylenediamine and sufficient benzene to form a 10% solution were added to a 1000 ml. round bottom flask equipped as in Example 1. 2,6-xylenol in amounts indicated in the following table was predissolved under nitrogen in 100 mls. of benzene and added over 25 minutes while passing 500 cc.'s per minute oxygen, through the reactor. The reaction was continued for three hours. Polymer was isolated by precipitation with methanol, washing with methanol and drying. The following results were obtained.

| Example No. | Concentration | Intrinsic Viscosity |
|---|---|---|
| 19 | 0.00 | 0.76 |
| 20 | 0.10 | 0.93 |
| 21 | 0.20 | 1.01 |
| 22 | 0.40 | 1.15 |
| 23 | 0.67 | 1.43 |
| 24 | 1.00 | 1.40 |
| 25 | 1.50 | 1.34 |
| 26 | 3.00 | 0.66 |
| 27 | 5.00 | 0.47 |
| 28 | 15.00 | 0.39 |

The above table establishes a relationship between concentration of phenolic additive and intrisic viscosity of formed polymer. As the concentration increases up to approximately 1.0% intrinsic viscosity increases. However, as the concentration increases further, the intrinsic viscosity drops off. The maximum at 1.0% is applicable only to the system 2,6-diphenylphenol and 2,6-xylenol, it being understood that other systems vary dependent upon the oxidative coupling potential of the phenol used.

Examples 29–30

These examples illustrate a procedure for the repolymerization of a poly-2,6-diphenyl-1,4-phenylene) ether both in the presence and absence of a phenol having a greater oxidative coupling capability than 2,6-diphenylphenol.

A solution was prepared in the reactor of Example 1 consisting of 24.9 gms. of polymer having an intrinsic viscosity of 0.76 dl./g. measured in chloroform at 30° C. dissolved in 250 cc.'s of benzene. A nitrogen atmosphere was maintained and 0.045 gms. of CuBr and N,N,N,N'-tetramethylethylene diamine each were added. The temperature was raised to 65° C. and oxygen was passed through at a rate of 500 cc./min. for a period of 3 hours. The polymer was recovered and its intrinsic viscosity was found to be substantially unchanged.

The procedure was repeated with the addition of 0.15 gm. of 2,6-xylenol. The polymer recovered weighed 23.9 gms. and had an intrinsic viscosity of 1.01 dl./g.

It should be understood that the invention is susceptible to further modification without departure from the scope of the invention or defined by the following claims.

I claim:

1. In a process for the formation of a 2,6-diaryl substituted polyphenylene ether comprising the steps of oxidatively coupling a 2,6-diaryl substituted monovalent phenol in the presence of an oxygen carrying copper-amine complex catalyst, the improvement comprising performing the oxidative coupling reaction in the presence of 0.01–5 weight percent, based upon the 2,6-diaryl substituted phenol to be polymerized, of a phenolic additive having a copper-amine complex catalyzed oxidative coupling capability greater than that of the 2,6-diaryl substituted phenol to be polymerized in an amount sufficient to form a polymer having a minimum intrinsic viscosity of 1.0 deciliter per gram in chloroform at 30° C.

2. The process of claim 1 where the 2,6-diaryl substituted phenol is 2,6-diphenylphenol.

3. The process of claim 2 where the phenolic additive is 2,6-xylenol.

4. The process of claim 3 where the 2,6-xylenol is added in an amount of up to 1.50 weight percent based upon the phenol to be polymerized.

5. The process of claim 1 where the 2,6-diaryl substituted phenol is 2,6-diphenylphenol and the phenolic additive is o-cresol.

6. The process of claim 1 where the 2,6-diaryl substituted phenol is 2,6-diphenylphenol and the phenolic additive is 2,5-xylenol.

7. The process of claim 1 where the 2,6-diaryl substituted phenol is 2,6-diphenylphenol and the phenolic additive is 2,5-diphenylphenol.

8. The process of claim 1 where the 2,6-diaryl substituted phenol is 2,6-diphenylphenol and the phenolic additive is 4,2'-dihydroxy-3,5,3'-triphenylbiphenyl.

References Cited

UNITED STATES PATENTS

| 3,306,874 | 2/1967 | Hay | 260—47 |
| 3,306,875 | 2/1967 | Hay | 260—47 |
| 3,313,776 | 4/1967 | Borman | 260—47 |

WILLIAM H. SHORT, *Primary Examiner.*

M. GOLDSTEIN, *Assistant Examiner.*